US009884764B2

(12) United States Patent
Ertaşet al.

(10) Patent No.: US 9,884,764 B2
(45) Date of Patent: Feb. 6, 2018

(54) PURIFICATION OF PHOSPHORUS DECASULFIDE (P4S10)

(71) Applicant: TUBITAK, Ankara (TR)

(72) Inventors: Erdal Ertaş, Kocaeli (TR); Turan Öztürk, Istanbul (TR); Ipek Ösken, Istanbul (TR)

(73) Assignee: TUBITAK, Ankara (TR)

( * ) Notice: Subject to any disclaimer, the term of this patent is extended or adjusted under 35 U.S.C. 154(b) by 0 days.

(21) Appl. No.: 15/315,390

(22) PCT Filed: Jun. 2, 2015

(86) PCT No.: PCT/IB2015/054163
§ 371 (c)(1),
(2) Date: Dec. 1, 2016

(87) PCT Pub. No.: WO2015/186055
PCT Pub. Date: Dec. 10, 2015

(65) Prior Publication Data
US 2017/0233251 A1 Aug. 17, 2017

(30) Foreign Application Priority Data
Jun. 2, 2014 (TR) ................ a 2014 06205

(51) Int. Cl.
C01B 17/00 (2006.01)
C01B 25/00 (2006.01)
C01B 25/14 (2006.01)

(52) U.S. Cl.
CPC .......... *C01B 25/14* (2013.01); *C01P 2006/80* (2013.01)

(58) Field of Classification Search
CPC .......... C01B 17/00; C01B 25/14; C01B 25/00
See application file for complete search history.

(56) References Cited

U.S. PATENT DOCUMENTS

| 1,054,250 | A | * | 2/1913 | Stock | ...................... C01B 25/00 423/303 |
| 4,173,621 | A | | 11/1979 | Krause et al. | |
| 4,374,706 | A | * | 2/1983 | Molla | ...................... C01B 25/00 203/91 |
| 5,283,042 | A | | 2/1994 | Atochem | |
| 5,663,402 | A | * | 9/1997 | Griffith | ...................... C01B 25/14 423/303 |

FOREIGN PATENT DOCUMENTS

| CN | 1887697 A | 1/2007 | | |
| CN | 1887698 A | 1/2007 | | |
| DE | 233365 A1 | 2/1986 | | |
| EP | 0008785 A1 | 3/1980 | | |
| EP | 0439391 A1 | * 7/1991 | .............. B01J 14/00 |
| EP | 2576438 A4 | * 1/2014 | .............. C01B 25/14 |

OTHER PUBLICATIONS

Turan Ozturk et al: "A Berzelius Reagent, Phosphorus Decasulfide (P4S10), in Organic Syntheses". Chemical Reviews, vol. 110, No. 6, Jun. 9, 2010, pp. 3419-3478, XP055218136.

* cited by examiner

*Primary Examiner* — Timothy C Vanoy
(74) *Attorney, Agent, or Firm* — Gokalp Bayramoglu

(57) ABSTRACT

The present invention relates to a new and simple purification process of phosphorus decasulfide ($P_4S_{10}$), also called phosphorus pentasulfide ($P_2S_5$), which is used as thionating agent for the syntheses of various organic compounds, particularly the organic compounds having sulfur heteroatom(s).

8 Claims, No Drawings

PURIFICATION OF PHOSPHORUS DECASULFIDE (P4S10)

TECHNICAL AREA

The present invention relates to a new and simple purification process of phosphorus decasulfide ($P_4S_{10}$), also called phosphorus pentasulfide ($P_2S_5$).

PREVIOUS TECHNIQUE

Nowadays, phosphorus decasulfide ($P_4S_{10}$) is widely used in industry and research labs, applications of which involve converting the carbonyl groups into thiones. formation of cyclic and heterocyclic systems and syntheses of sulfur containing organic compounds. Moreover, in industry, it is used in production of additives for lubricants and oil, syntheses insecticides, preparation of conducting and semiconducting materials having electronic and optoelectronic properties and syntheses of fire retardants.

In spite of its widespread use, reactivity of $P_4S_{10}$ is strongly dependent on its purity. If it is not pure enough, it has a strong smell of rotten-egg and gives low-yield or no-yield reactions. In some cases, impure $P_4S_{10}$ may yield a product totally different than the expected one.

Current purification techniques of $P_4S_{10}$, either in high or low levels, include distillation or soxhlet extraction with carbon disulfide ($CS_2$), which is toxic and has an extremely nasty smell. As these methods are difficult to perform, most of the available $P_4S_{10}$s are not pure enough.

A Chinese patent (CN1887697) describes the purification of industrial $P_4S_{10}$ applying a simple distillation processes.

A Chinese patent (CN1887698) describes purification of industrial P4S10 applying a vacuum distillation method.

An USA patent (U.S. Pat. No. 5,283,042) describes a method for purification of white phosphorus.

SHORT DESCRIPTION OF THE INVENTION

The aim of the present invention is to provide a simple purification process of phosphorus decasulfide ($P_4S_{10}$). The process involves removal of impurities in $P_4S_{10}$ by taking advantage of rapid reactions of impurities with water compare with $P_4S_{10}$. This process is the best method available for the purification of $P_4S_{10}$.

Detailed Description of the Invention The method for purifying diphosphorus pentasulfide ($P_2S_5$), also called tetraphosphorus decasulfide ($P_4S_{10}$) comprises the following steps;

Mixing tetraphosphorus decasulfide into an organic solvent by addition,

Dropwise addition of water into the mixture of tetraphosphorus decasulfide and the organic solvent until the color of the mixture becomes light yellow, gray or white, Mixing the mixture after the completion of water addition, Filtering out the solid compounds in the mixed solution, Drying the solid obtained by filtration.

In the method subject to the invention, first tetraphosphorus decasulfide is admixed into an organic solvent. For the preferred realization of the invention, the addition operation is performed in a round bottom flask. For various applications of the invention, any organic solvents such as toluene, benzene, xylene, chlorobenzene, bromobenzene, dichlorobenzene, dibromobenzene, dichloromethane, chloroform, carbontetrachloride, dichloroethane, hexane, heptane, pentane, petroleum ether, diethyl ether, tetrahydrofuran, ethyl acetate, dioxane, pyridine, acetonitrile, acetone, triethyl amine, dimethyl formamide, dimethyl sulfoxide can be used. In other applications of the invention, at this step the amount of tetraphosphorus decasulfide used can range from milligram to tone, while the amounts of organic solvents can be used within the range of milliliter to million liters.

Subsequently within method, water is drop wise added into the mixture of tetraphosphorus decasulfide and organic solvent until a pale yellow, gray or white color is reached. The volume of the added water can range from milliliter to million liters levels in different applications of the method. The step of adding water can be performed between the temperatures of −90 (minus ninety) ° C. and the boiling point of the organic solvent employed. In the preferred embodiment of the invention, the step of adding water is carried out at room temperature.

After the step of water addition, at a temperature between −90 (minus ninety) ° C. and the boiling point of the organic solvent used, the mixture is stirred for about the desired duration (in a range of a few seconds up to hours) and the solid compounds in the stirred mixture are filtered. Filtration process is performed either as simple filtration or as vacuum filtration in various applications of the method.

Within the method, the solid compound filtered out is dried and pure tetraphosphorus decasulfide is obtained. Drying step of the present invention is achieved under either the atmospheric pressure or vacuum in different applications.

Using the method, it is possible to develop a wide variety of applications and the invention is not limited to the examples described herein and is essentially subject to the claims mentioned.

The invention claimed is:

1. A method for purification of diphosphorus pentasulfide ($P_2S_5$), also called tetraphosphorus decasulfide ($P_4S_{10}$), comprising the following steps:
   admixing the tetraphosphorus decasulfide into an organic solvent to obtain a first mixture;
   dropwise adding water to the first mixture until a pale yellow, gray or white solution is obtained;
   mixing the solution after the step of dropwise adding water is completed to obtain a second mixture;
   filtering solid compounds from the second mixture;
   drying the solid compounds,
   wherein the tetraphosphorus decasulfide is admixed into the organic solvent using a round bottom flask.

2. The method according to claim 1, wherein the organic solvent is selected from the group consisting of toluene, benzene, xylene, chlorobenzene, bromobenzene, dichlorobenzene, dibromobenzene, dichloromethane, chloroform, carbontetrachloride, dichloroethane, hexane, heptane, pentane, petroleum ether, diethyl ether, tetrahydrofuran, ethyl acetate, dioxane, pyridine, acetonitrile, acetone, triethylene amine, dimethyl formamide, and dimethyl sulfoxide.

3. The method according to claim 1, wherein the step of dropwise adding water into the first mixture is performed at a temperature between −90° C. and a boiling point of the organic solvent.

4. The method according to claim 1, wherein the step of dropwise adding water into the first mixture is performed at room temperature.

5. The method according to claim 1, wherein, the step of mixing the solution is performed at a temperature between −90° C. and a boiling point of the organic solvent.

6. The method according to claim 1, wherein the step of filtering solid compounds from the second mixture comprises vacuum filtration.

7. The method according to claim 1, wherein the step of drying the solid compounds is performed at atmospheric pressure.

8. The method according to claim 1, wherein the step of drying the solid compounds is performed under vacuum.

* * * * *